(No Model.)

F. S. BEAN.
DEVICE FOR LIGHTING LAMPS.

No. 368,448. Patented Aug. 16, 1887.

WITNESSES.
Arthur P. Ford.
Michael A. Grrrrd.

INVENTOR.
Fred. S. Bean
Per Brown Bros.
Attorneys.

UNITED STATES PATENT OFFICE.

FRED S. BEAN, OF MANCHESTER, NEW HAMPSHIRE.

DEVICE FOR LIGHTING LAMPS.

SPECIFICATION forming part of Letters Patent No. 368,448, dated August 16, 1887.

Application filed January 4, 1886. Serial No. 187,565. (No model.)

*To all whom it may concern:*

Be it known that I, FRED S. BEAN, of Manchester, in the county of Hillsborough and State of New Hampshire, have invented certain new and useful Improvements in Devices for Lighting Lamps, of which the following is a full, clear, and exact description.

This invention has for its object the automatical lighting of a lamp, &c.; and the invention consists, in combination with the wick-tube of a lamp, &c., of two receptacles, in one of which is to be placed sulphuric acid and in the other chlorate of potassium, with or without a little sugar, and the one receptacle so arranged in relation to the other, and both in relation to the end of the tube where the wick projects to be burned, that if the lamp, &c., is jarred or shaken the sulphuric acid will be spilled out of its receptacle into the other receptacle containing the chlorate of potassium and sugar, when, as the chemicals or materials mix or combine with each other, heat will be generated, causing the materials to ignite, the flame of which will light the wick, all substantially as hereinafter fully described, reference being had to the accompanying sheet of drawings, in which—

Figure 1:
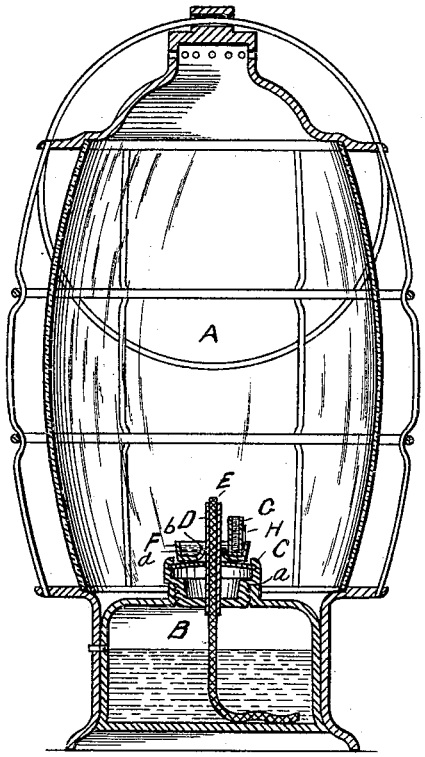
Figure 2:
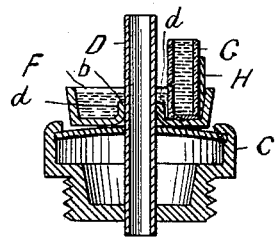
Figure 3:
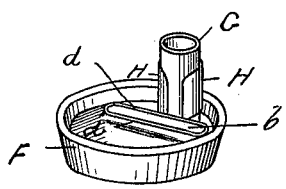

Figure 1 is a vertical cross-section of a lantern, in which is a lamp, also in cross-section, having combined with its wick-tube the present invention. Fig. 2 is a vertical section of the wick-tube and its carrier or cap of the lamp, having the two receptacles combined therewith enlarged; and Fig. 3, a perspective view of the receptacle enlarged.

In the drawings, A represents a lantern, B a lamp within the same, C the cap adapted to screw into the lamp-body at $a$, D its wick-tube, and E its wick, all substantially as is common in lanterns and lamps, and needing no particular description herein.

F is a flat dish or receptacle of metal, having an opening, $b$, adapted to fit closely and slide over the wick-tube D; and G, a tube and receptacle of glass in the dish F, and fitting within spring-clamps H of the dish. The receptacle G is made of glass, for the purpose of resisting the action of the chemical contained in it.

When the dish F is placed over and attached to the wick-tube, as shown in Figs. 1 and 2, chlorate of potassium with a little sugar is placed within the dish, and sulphuric acid in the tube G. At the opening $b$ in the dish the bottom is pressed upward to form sides, as at $d$, to prevent the liquid from passing down between it and the outside of the wick-tube.

With the two receptacles F G filled with their respective chemicals or materials, if the lantern is taken up and shaken or jarred slightly, the acid in the tube G will be spilled over into the chlorate of potassium and sugar in the dish F, and the instant they mix or combine with each other ignition takes place, the flame of which surrounds the wick-tube and its wick at its end projecting from the wick-tube and lights the same.

This invention is very advantageous in many respects and for many purposes, and especially where it is desired to light the lamp in a lantern, and when used in the fire department of a city, &c., where the saving of time and trouble when starting for a fire is very desirable, for a lantern having its lamp supplied with this invention will be instantly and automatically lighted from merely taking hold of the lantern to carry it, for such will jar the chemical sufficiently in the tube to spill it over into the dish, and thus the wick will be lighted, as described, and without any especial care or attention of the fireman.

The dish and its tube can be of any suitable material and arranged in any suitable manner, and they can be attached permanently to the wick-tube or arranged so as to be attached and detached at pleasure; also the potassium and sugar can be placed in the tube and the acid in the dish. In that case the potassium would be spilled over into the acid, accomplishing the same result.

The sugar can be dispensed with and the chlorate of potassium used alone. The tube G, by being attached to the dish by the spring-clamps H, enables it to be removed from the dish at pleasure. It can, however, be attached permanently to the dish.

The invention is applicable to all kinds of lamps; also candles, &c.

Having thus described my invention, what I claim is—

1. The combination, with the wick-tube of a lamp-burner, of two receptacles, F and G, attached to the wick-tube, one receptacle being so placed as to spill its contents into the other when agitated, substantially as described.

2. The combination, with the wick-tube of a lamp-burner, of a receptacle, F, secured thereto, and a second receptacle, G, mounted on the first and so placed as to spill its contents thereinto when agitated, substantially as described.

3. The combination, with the wick-tube of a lamp-burner, of a receptacle, F, provided with an opening, b, by which it is fitted upon the wick-tube, and a receptacle, G, substantially as described.

4. The combination, with the wick-tube, of the receptacle F, formed with an opening, b, by which it is fitted upon the wick-tube, the spring-clamp, and the receptacle G, substantially as described.

5. The combination, with the wick-tube of a lamp-burner, of a metallic receptacle, F, attached to the wick-tube, a glass receptacle, G, and means, substantially as set forth, for detachably securing it upon the receptacle F.

In testimony whereof I have hereunto set my hand in the presence of two subscribing witnesses.

FRED S. BEAN.

Witnesses:
JAMES E. DODGE,
PELEG D. HARRISON.